United States Patent
Suzuki

(10) Patent No.: US 7,346,267 B2
(45) Date of Patent: Mar. 18, 2008

(54) VIDEO AND AUDIO REPRODUCTION APPARATUS

(75) Inventor: Nobuyuki Suzuki, Fuchu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 648 days.

(21) Appl. No.: 10/994,534

(22) Filed: Nov. 23, 2004

(65) Prior Publication Data

US 2005/0117887 A1   Jun. 2, 2005

(30) Foreign Application Priority Data

Nov. 27, 2003   (JP) .............................. 2003-397810

(51) Int. Cl.
 *H04N 5/91* (2006.01)
 *H04N 7/00* (2006.01)
(52) U.S. Cl. .......................................... 386/95; 386/125
(58) Field of Classification Search .................. 386/95, 386/125

See application file for complete search history.

(56) References Cited

U.S. PATENT DOCUMENTS

2002/0064188 A1* 5/2002 Mizobata ..................... 370/535

OTHER PUBLICATIONS

DVD Specifications for Read-Only Disc/Part 3: Video Specifications Version 1.13, 1996-2002, 25 pgs.
Video CD Specification Version 2.0, Compact Disc Digital Video, Philips Consumer Electronics B.V., Jul. 1994.

* cited by examiner

*Primary Examiner*—Thai Q. Tran
*Assistant Examiner*—Girumsew Wendmagegn
(74) *Attorney, Agent, or Firm*—Pillsbury Winthrop Shaw Pittman, LLP

(57) ABSTRACT

A system control unit sets stream_id of each reproduced elementary stream and the total number of streams in each of the elementary stream from management information read from a medium. A stream separation unit reads an MPEG stream from the medium to record a combination of a stream identification number and an attribute of the stream as a stream attribute table. When the stream separation unit can not detect the set stream_id from the MPEG stream, the system control unit resets stream_id of the reproduced elementary stream based on the stream attribute table

7 Claims, 21 Drawing Sheets

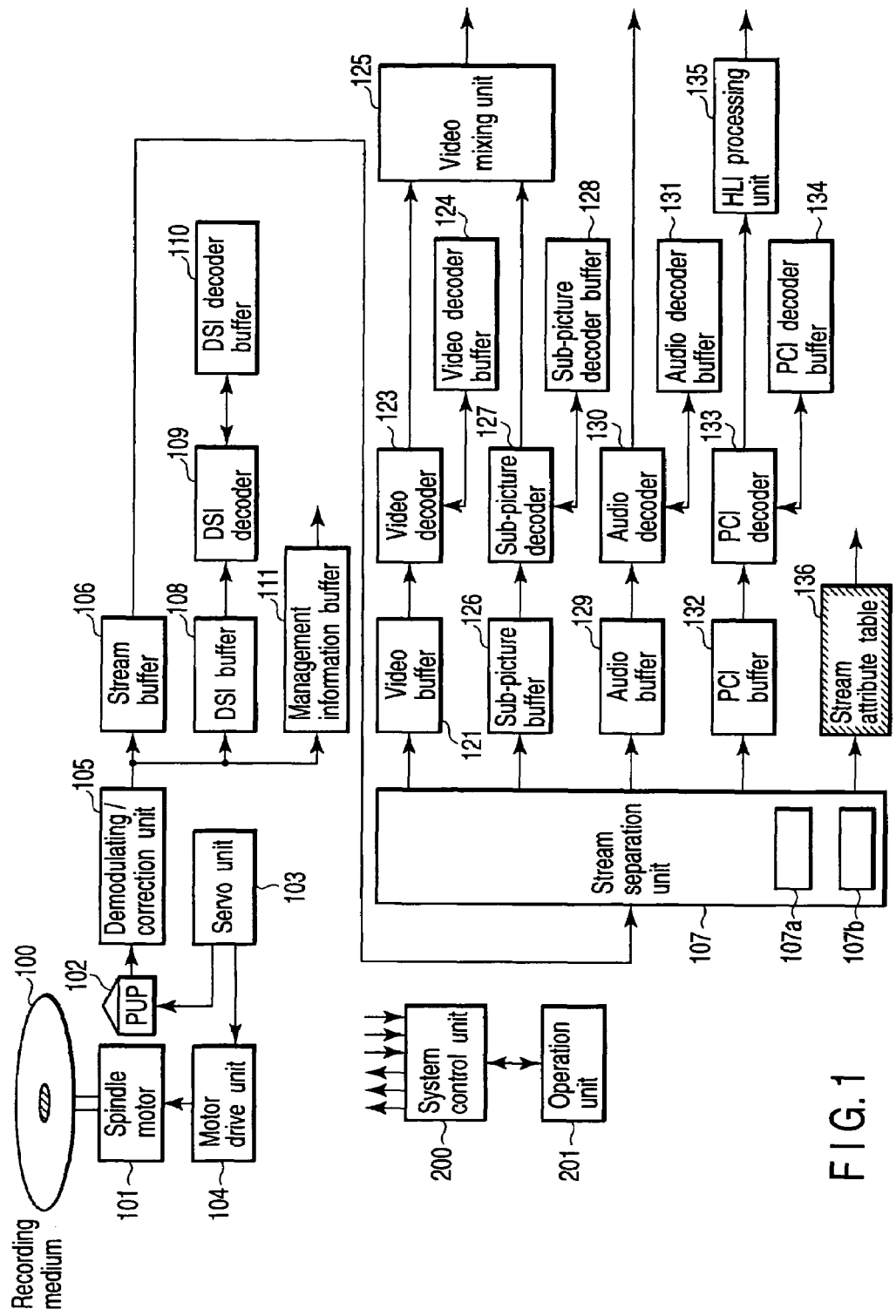
F I G. 1

FIG. 3

| Packet payload type | | stream_id | sub_stream_id | Comment |
|---|---|---|---|---|
| Video | | 1110 0000b (E0h) | None | |
| Audio | MPEG1 audio | 1100 0***b | | |
| | MPEG2 audio (If MPEG2 extension audio is not present) | | | |
| | MPEG2 main audio (If MPEG2 extension audio is present) | | | |
| | MPEG2 extension audio | 1101 0***b | | |
| | Dolby AC-3 audio | 1011 1101b (BDh) = private_stream_1 | 1000 0***b | *** = Decoding Audio stream number |
| | DTS audio | | 1000 1***b | |
| | SDDS audio | | 1001 0***b | |
| | Linear PCM audio | | 1010 0***b | |
| Sub-picture | | 1011 1101b (BDh) = private_stream_1 | 001* ****b | ***** = Decoding Sub-picture stream number |
| PCI (Presentation control information) | | 1011 1111b (BFh) = private_stream_2 | 0000 0000b | |
| DSI (Data search information) | | | 0000 0001b | |
| Padding | | 1011 1110b (BEh) | None | |

| | The number of streams | stream_id | sub_stream_id |
|---|---|---|---|
| Video | 1 | E0h | |
| PCI | 1 | BFh | 00h |
| Audio | 2 | BDh | 80h |
| Sub - picture | 1 | BDh | 20h |

Video information

| stream_id | Atribute |
|---|---|
| 0xE0 | horizontal_size<br>vertical_size<br>pel_aspect_ratio<br>picture_rate<br>bit_rate<br>: |
| 0xE1 | horizontal_size<br>vertical_size<br>pel_aspect_ratio<br>picture_rate<br>bit_rate<br>: |
| .... | .... |

Audio information

| stream_id | Sub_stream_id | Atribute |
|---|---|---|
| 0xC0 | None | MPEG2 without extension |
| 0xC1 | None | MPEG2 with extension |
| 0xBD | 0xA0 | Linear PCM |
| 0xBD | 0x80 | Dolby AC-3 |
| 0xBD | 0x81 | Dolby AC-3 |
| 0xBD | 0x82 | Dolby AC-3 |
| .... | .... | .... |

Sub-picture information

| stream_id | Sub_stream_id | Atribute |
|---|---|---|
| 0xBD | 0x20 | None |
| 0xBD | 0x21 | None |
| 0xBD | 0x23 | None |
| 0xBD | 0x25 | None |
| .... | .... | .... | stream_id_error flags

| Video_stream_id_error | Audio_stream_id_error | Sub_picture_stream_id_error |
|---|---|---|
| 0 | 1 | 0 |

F I G. 11

System_header value of Motion Picture

| MPEG field name | Value in As Sector | Value in Vs Sector |
|---|---|---|
| System_header_start_code | 000001BBh | 000001BBh |
| rate_bound | 3528 | 3528 |
| audio_bound | 1 | 0 |
| fixed_flag | 0 | 0 |
| CSPS_flag | 1 | 1 |
| system_audio_lock_flag | 1 | 1 |
| system_video_lock_flag | 1 | 1 |
| video_bound | 0 | 1 |
| stream_id | C0h | E0h |
| STD_buffer_bound_scale | 0 | 1 |
| STD_buffer_size_bound | 32 | 46 |

System_header value of Normal resolution Still Picture

| MPEG field name | Value |
|---|---|
| System_header_start_code | 000001BBh |
| rate_bound | 3528 |
| audio_bound | 0 |
| fixed_flag | 0 |
| CSPS_flag | 1 |
| system_audio_lock_flag | 1 |
| system_video_lock_flag | 1 |
| video_bound | 1 |
| stream_id | E1h |
| STD_buffer_bound_scale | 1 |
| STD_buffer_size_bound | 46 |

System_header value of Normal and High resolution Still Picture

| MPEG field name | Value |
|---|---|
| System_header_start_code | 000001BBh |
| rate_bound | 3528 |
| audio_bound | 0 |
| fixed_flag | 0 |
| CSPS_flag | 1 |
| system_audio_lock_flag | 1 |
| system_video_lock_flag | 1 |
| video_bound | 1 |
| (Normal resolution) | |
| stream_id | E1h |
| STD_buffer_bound_scale | 1 |
| STD_buffer_size_bound | 46 |
| (High resolution) | |
| stream_id | E2h |
| STD_buffer_bound_scale | (encaded picture size + 1023) / 1024 |
| STD_buffer_size_bound | 46 |

FIG. 16

| Packet Payload Type | | stream_id | Comment |
|---|---|---|---|
| Video | Motion pictures | 1110 0000b (E0h) | Still pictures are located in SEGMENT area (Track1) All Still pictures are encoded in Normal resolution (352X240 for NTSC or 352X288 for PAL). As an option, Still pictures can be encoded in both Normal and Hight resolution (704X480 for NTSC or 704X576 for PAL). |
| | Nomal resolution Still | 1110 0001b (E1h) | |
| | High resolution Still | 1110 0010b (E2h) | |
| MPEG1 audio | | 1100 0000b (E0h) | |
| Padding | | 1011 1110b (BEh) | |

F I G. 17

| sequence_header | number of bits | Value |
|---|---|---|
| sequence_header_code | 32 | 0x000001B7 |
| horizontal_size | 12 | |
| vertical_size | 12 | |
| pel_aspect_ratio | 4 | |
| picture_rate | 4 | |
| bit_rate | 18 | |
| ⋮ | ⋮ | ⋮ |

FIG.19

VIDEO AND AUDIO REPRODUCTION APPARATUS

CROSS-REFERENCE TO RELATED APPLICATIONS

This application is based upon and claims the benefit of priority from prior Japanese Patent Application No. 2003-397810, filed Nov. 27, 2003, the entire contents of which are incorporated herein by reference.

BACKGROUND OF THE INVENTION

1. Field of the Invention

The present invention relates to a video and audio reproduction apparatus which reproduces an MPEG stream (an MPEG-2 program stream or an MPEG-1 system stream).

2. Description of the Related Art

For a medium such as a CD (Compact Disk) and a DVD (Digital Versatile Disk), the video and audio streams are reproduced based on management information recorded in the medium. That is, a stream identification number (stream_id) is set for each reproduced stream based on the management information, and the stream having set stream_id is reproduced among the streams read from the medium. DVD Specification for Read-Only Disk/part 3, Video Specification provides an explanation of a method of reproducing the stream and various descriptions concerning stream_id. When the management information does not coincide with information described in the stream, the normal reproduction can not be performed. For example, when stream_id described in the management information of the medium differs from stream_id of an elementary stream included in the actual stream read from the medium due to error of information recorded in the medium, there is a problem that the desired stream is not performed.

BRIEF SUMMARY OF THE INVENTION

According to one embodiment of the invention, there is provided a video and audio reproduction apparatus which reproduces an MPEG stream including each of video and audio elementary streams recorded in a medium, the apparatus comprising: a read unit which reads management information and the MPEG stream from the medium; a setting unit which refers to the management information read by the read unit to set a stream identification number of each elementary stream to be reproduced and the total number of types of the stream identification numbers in each of the elementary streams; a detection unit which detects the stream identification number and an attribute of the stream from the MPEG stream read by the read unit and records a combination of the stream identification number and the attribute of the stream as a stream attribute table in a memory; a notification unit which make a notification that the stream having the stream identification number does not exist, when the stream identification number set by the setting unit can not be detected from the MPEG stream read by the read unit; and a resetting unit which receives the notification of the notification unit to reset the stream identification number of the elementary stream to be reproduced based on the stream attribute table.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram in reproducing DVD video of the invention;

FIG. 3 is a stream identification number table of DVD-video;

FIG. 10 shows contents of a register 107a;

FIG. 11 shows an overview of a stream attribute table;

FIG. 16 shows contents of a system header of the video CD;

FIG. 17 is a stream identification number table of the video CD;

FIG. 19 shows contents of a sequence header of an MPEG video elementary stream;

DETAILED DESCRIPTION OF THE INVENTION

First Embodiment

Figure 2:
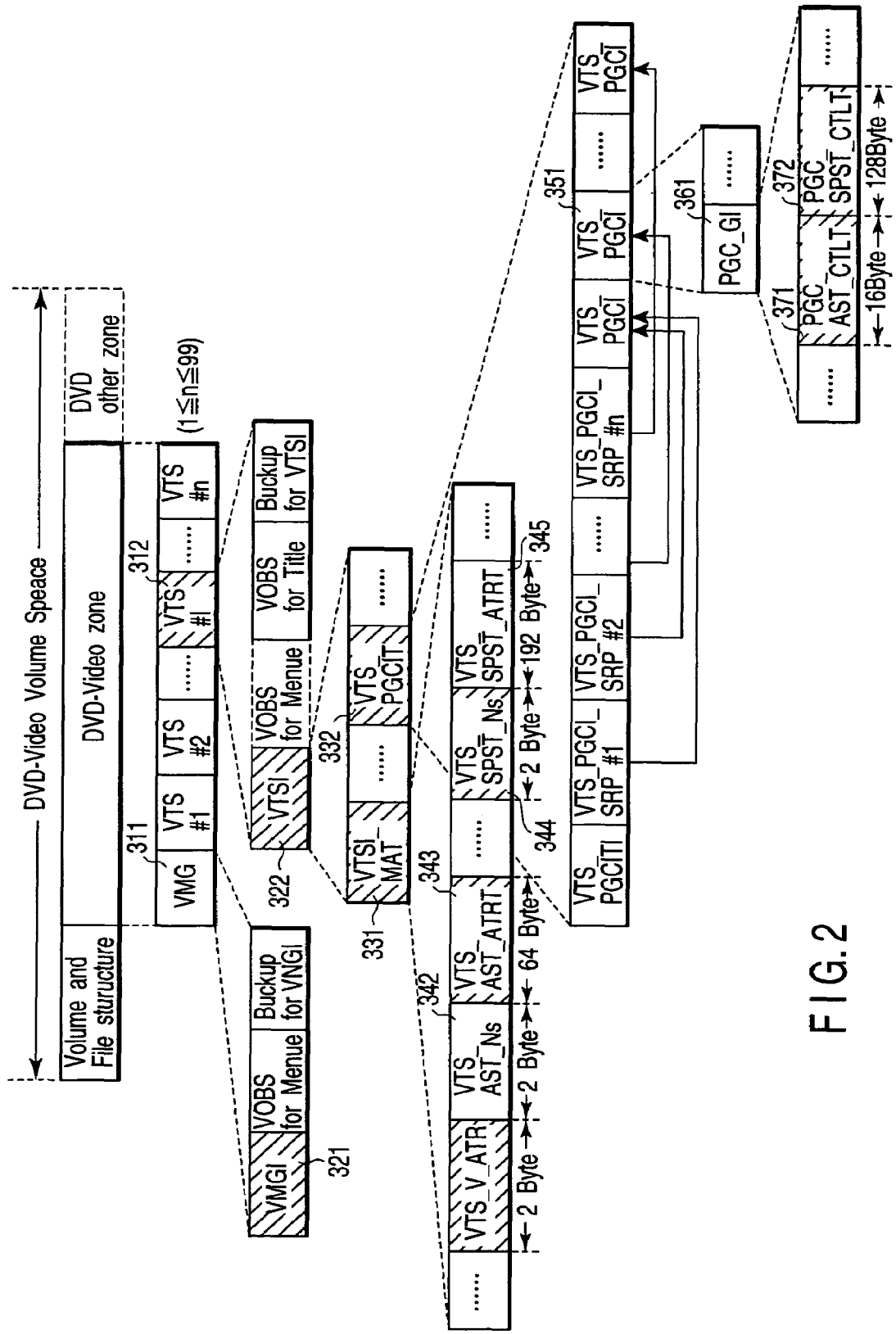
FIG. 2 shows a structure of management information of DVD video.

Referring to the accompanying drawings, preferred embodiments of the invention will be described below.

<DVD Video Reproduction>

FIG. 1 is a block diagram in reproducing DVD video (MPEG-2 stream) of the invention. In FIG. 1, a recording medium 100 loaded on a turntable (not shown) is rotated by a spindle motor 101. During the reproduction, information recorded in the recording medium 100 is read by a pickup unit (PUP) 102. A servo unit 103 performs feed control in a disk radial direction, focus control, and tracking control of the pickup unit 102. During the reproduction, the servo unit 103 also transmits a control signal to a motor drive unit 104 to perform rotational control of the spindle motor 101, i.e. the rotational control of the recording medium 100.

An output signal of the pickup unit 102 is inputted to a demodulating/error correction unit 105 to perform demodulation and error correction. The error corrected data is inputted to a stream separation unit 107 through a stream buffer 106. The error corrected data is input to a DSI decoder 109 through a DSI (Data Search Information) buffer 108. The DSI decoder 109 is connected to a DSI decoder buffer 110. The decoded DSI is transmitted to a system control unit 200. The error corrected data is also transmitted to the system controller 200 through a management information buffer 111. The later-mentioned VMGI and VTSI are written in the management information buffer 111, and the system control unit 200 reads the information such as VMGI and VTSI to perform reproduction control. The management information indicates the management information for managing the MPEG system stream such as VMGI and VTSI.

The stream separation unit 107 performs a process of separating each pack. A video pack (V_PCK) fetched by the stream separation unit 107 is input to a video decoder 123 through a video buffer 121 and decoded by the video decoder 123. The video decoder 123 is connected to a video decoder buffer 124. A video signal output from the video decoder 123 is input to a video mixing unit 125.

A sub-picture pack (SP_PCK) fetched by the stream separation unit 107 is input to a sub-picture decoder 127 through a sub-picture buffer 126 and decoded by the sub-picture decoder 127. The sub-picture decoder 127 is connected to a sub-picture decoder buffer 128. A sub-picture output from the sub-picture decoder 127 is input to the video mixing unit 125. Therefore, a signal in which the sub-picture is superimposed on a main video signal is obtained from the video mixing unit 125, and the signal is supplied to a display.

An audio pack (A_PCK) fetched by the stream separation unit 107 is input to an audio decoder 130 through an audio buffer 129 and decoded by the audio decoder 130. The audio decoder 130 is connected to an audio decoder buffer 131. A/D conversion (not shown) of the output of the audio decoder 130 is performed and supplied to a speaker. A PIC (Presentation Control Information) pack fetched from the stream separation unit 107 is input to a PCI decoder 133 through a PCI buffer 132 and decoded by the PCI decoder 133. The PCI decoder 133 is connected to a PCI decoder buffer 134. The output of the PCI decoder 133 is input to a highlight information (HLI) processing unit 135.

Thus, the sub-picture (subtitles and characters) information, the audio information, the management information, the control information are recorded in the recording medium 100 corresponding to the video information. The main video information, the sub-picture (subtitles and characters) information, the audio information, the management information, the control information, and the like are separated and derived in the stream separation unit 107. In this case, various languages can be selected as the sub-picture (subtitles and characters) information and the audio information, and the selection is performed under the control of system control unit 200. User's input operation is given to the system control unit 200 through an operation unit 201. Decoding processing corresponding to a type of the display device is performed in the video decoder 123 which decodes the main video information. For example, the main video information is converted into NTSC, PAL, SECAM, a wide screen, or the like. The audio information of the stream specified by the user is input to and decoded by the audio decoder 130. The sub-picture data of the stream specified by the user is also input to and decoded by the sub-picture decoder 127.

Figure 4:
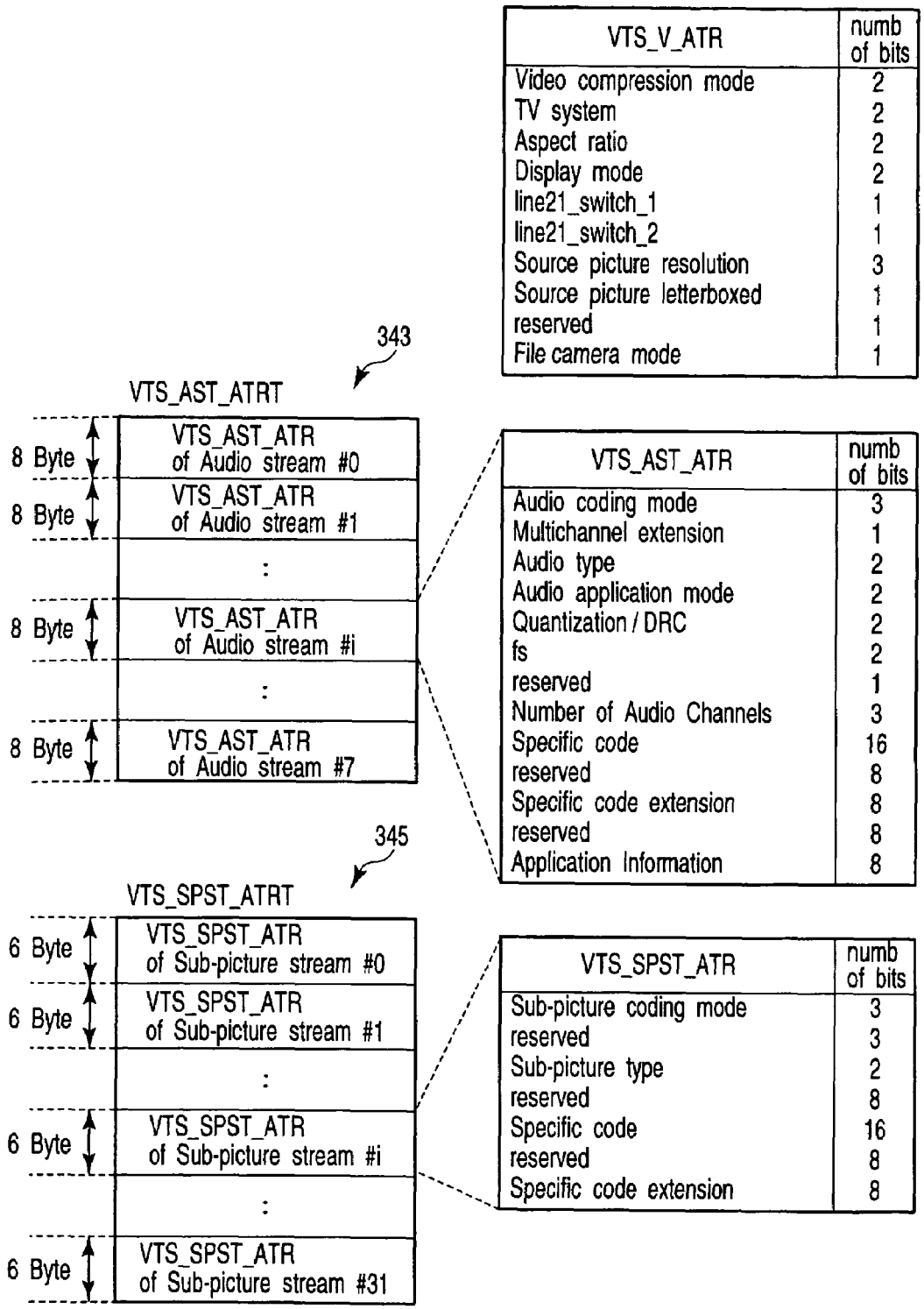
FIG. 4 shows contents of an attribute table of a video title set in DVD video.
Figure 5:
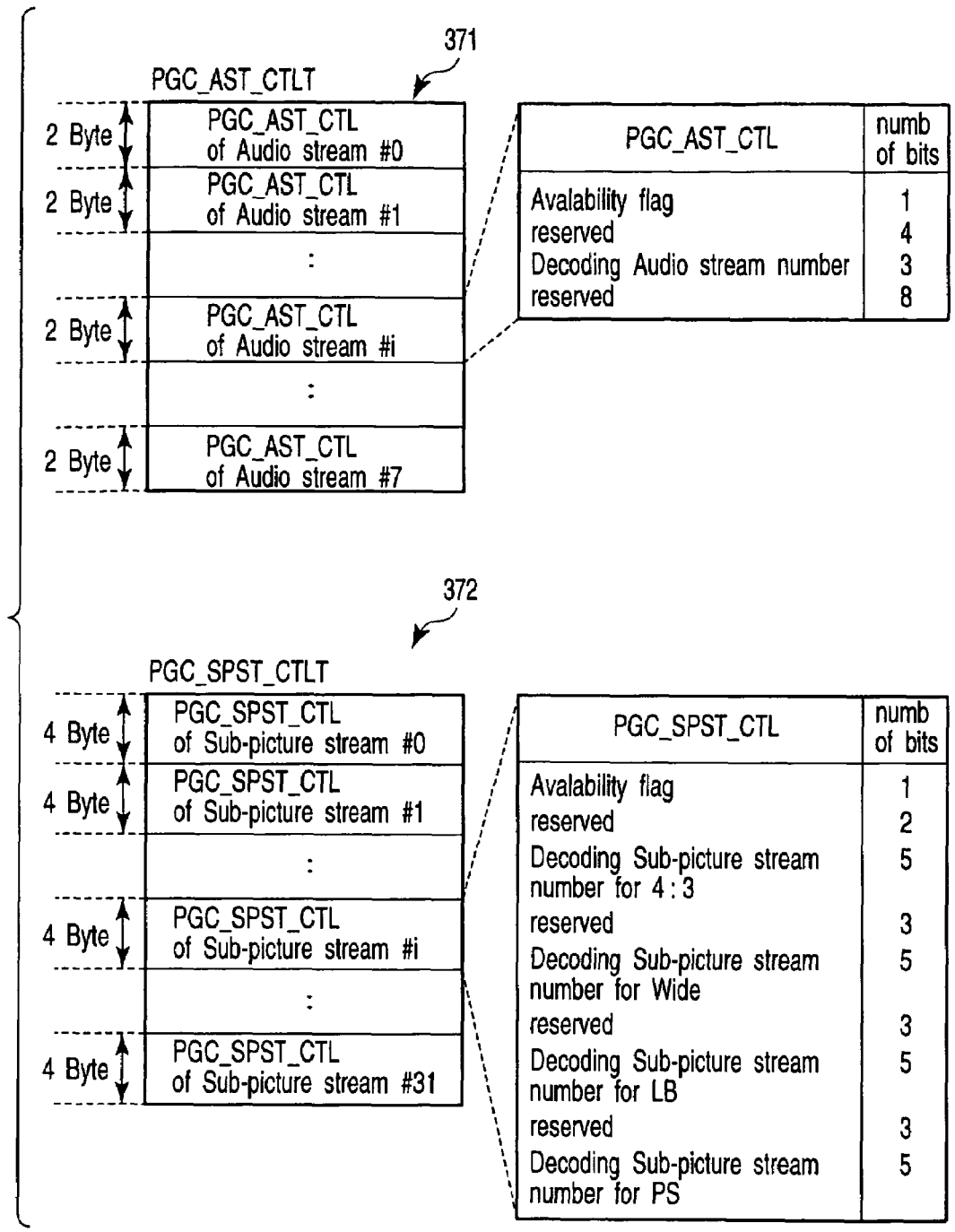
FIG. 5 shows contents of a stream control table of a program chain in DVD video.

Referring to FIGS. 2 to 5, a method of setting the stream identification number performed by the system control unit 200 will be described below. The stream identification indicates stream_id and sub_stream_id, and hereinafter the stream identification is referred to as "stream_id" and "sub_stream_id" if necessary. FIG. 2 shows a structure of the management information of the DVD video, FIG. 3 is a stream identification number table of the DVD-video, FIG. 4 shows contents of an attribute table of a video title set in the DVD video, and FIG. 5 shows the contents of a stream control table of a program chain in the DVD video.

The system control unit 200 reads VMGI (Video Manager Information) 321 of VGM (Video Manager) 311 from the management information buffer 111 (see FIG. 2). At this point, the system control unit 200 reads VTSI (Video Title Set Information) 322 of the title selected by the user through the operation unit 201 or the title automatically selected in startup.

As shown in FIG. 3, a DVD stream can have only one (one type) video stream. At this point, since stream_id=E0h, the system control unit 200 sets the value of stream_id in a register 107a of the stream separation unit 107 with respect to the video. As shown in FIG. 3, since stream_id=BFh and sub_stream_id=00h, a PCI packet sets these values. Maltiplexing can be performed up to eight in the audio stream, and the multiplexing can be performed up to 32 in the sub-picture stream.

Then, the method of selecting the audio stream will be described.

The system control unit 200 can know the number of audio streams (maximum number is eight) included in the title set from VTS_AST_Ns (Video Title Set Audio Stream Numbers) 342 located in VTSI_MAT (Video Title Set Information Manager Table) 331 in VTSI 322. The system control unit 200 can also know the selected audio attributes (Dolby AC-3, MPEG audio, Linear PCM audio, and the like) from VTS_AST_ATRT (Video Title Set Audio Stream Attribute Table) 343 in VTSI_MAT (Video Title Set Information Manager Table) 331 according to the audio stream number selected through the operation unit 201 by the user or the audio stream number automatically selected in startup (see FIG. 4).

Further, the system control unit 200 can select the desired VTS_PGCI (Video Title Set Program Chain Information) 351 from VTS_PGCIT (Video Title Set Program Chain Information Table) 332, and the system control unit 200 can know a decoding audio stream number (=lower-order three bits of stream_id or sub_stream_id) from PGC_AST_CTLT (Program Chain Audio Stream Control Table) 371 in PGC_GI (Program Chain General Information) 361 according to the selected audio stream number (see FIG. 5).

As described above, the system control unit 200 knows the number of audio streams included in the selected VTS (Video Title Set) 312, and the system control unit 200 knows the audio attributes (Dolby AC-3, MPEG audio, Linear PCM audio, and the like) and the decoding audio stream number (=lower-order three bits of stream_id or sub_stream_id) from the selected audio stream number. Therefore, the system control unit 200 selects the number of audio streams, stream_id, and sub_stream_id to set these values in the stream separation unit 107.

Then, the method of selecting the sub-picture stream will be described.

The system control unit 200 can know the number of sub-picture streams (maximum number is 32) included in the title set from VTS_SPST_Ns (Video Title Set Sub-Picture Stream Numbers) 344 located in VTSI_MAT (Video Title Set Information Manager Table) 331 in VTSI 322. The system control unit 200 can also know the selected sub-picture attributes from VTS_SPST_ATRT (Video Title Set Sub-Picture Stream Attribute Table) 345 in VTSI_MAT (Video Title Set Information Manager Table) 331 according to the sub-picture stream number selected through the operation unit 201 by the user or the sub-picture stream number automatically selected in startup (see FIG. 4).

Further, the system control unit 200 can select the desired VTS_PGCI (Video Title Set Program Chain Information) 351 from VTS_PGCIT (Video Title Set Program Chain Information Table) 332, and the system control unit 200 can know a decoding sub-picture stream number (=lower-order five bits of sub_stream_id) from PGC_SPST_CTLT (Program Chain Sub-Picture Stream Control Table) 372 in PGC_GI (Program Chain General Information) 361 according to the selected sub-picture stream number (see FIG. 5).

As described above, the system control unit 200 knows the number of sub-picture streams included in the selected VTS (Video Title Set) 312 which is automatically selected or selected by the user, and the system control unit 200 knows the sub-picture attributes and the decoding audio stream number (=lower-order five bits of sub_stream_id) from the selected sub-picture stream number. Therefore, the system control unit 200 selects the number of sub-picture streams, stream_id (=procate_stream_1), and sub_stream_id to set these values in the register 107a of the stream separation unit 107.

Then, the operation of the stream separation unit 107 will be described.

Figure 6:
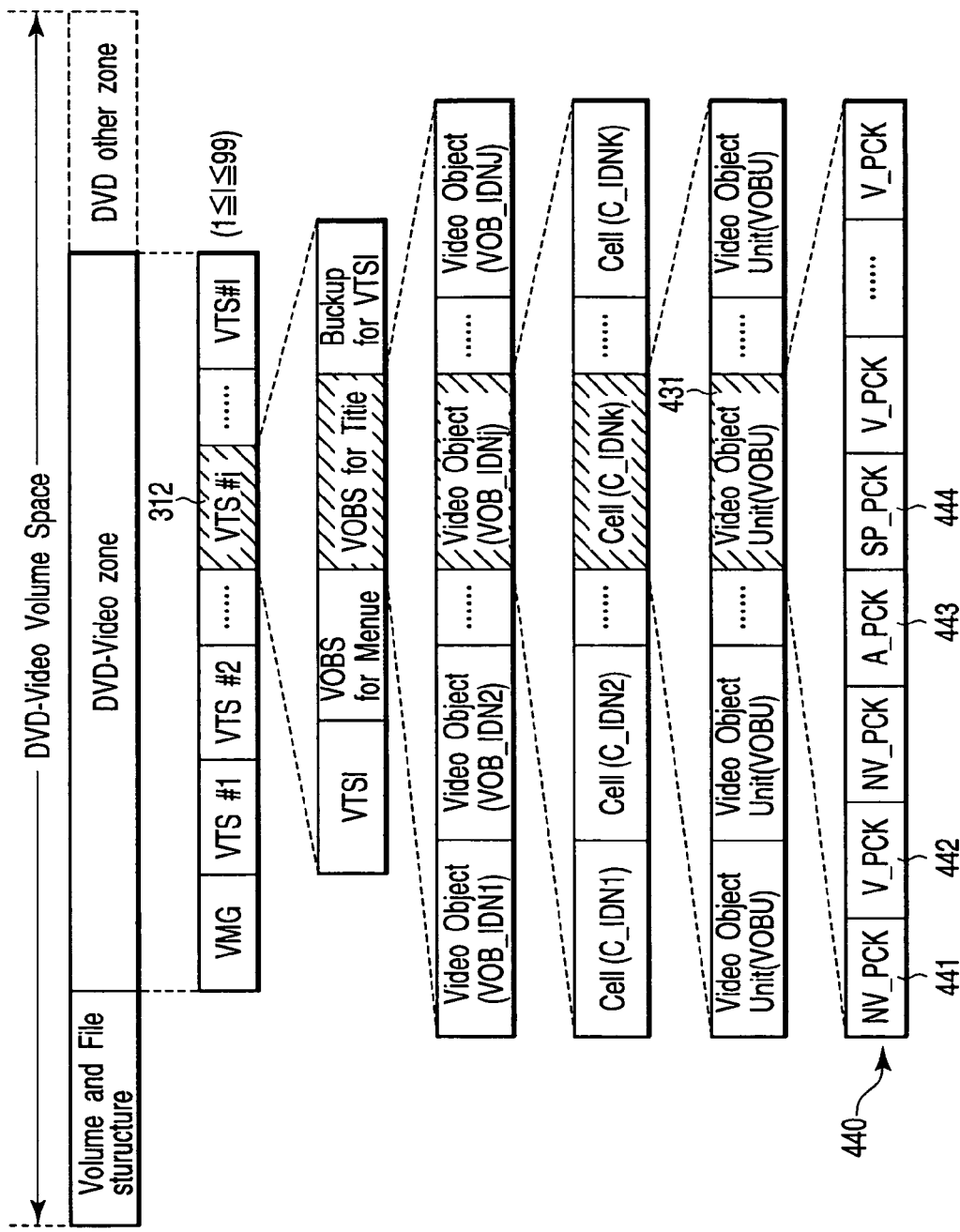
FIG. 6 shows a stream structure of DVD video.

FIG. 6 shows a stream structure of the DVD video. The DVD stream is formed by continuous video object units (VOBU) 431 which are of a minimum access unit. VOBU 431 is pursuant to the MPEG-2 program stream. VOBU 431 always starts from a navigation pack (NV_PCK) 441, and then a video pack (V_PCK) 442, a sub-picture pack (SP_PCK) 444, and an audio pack (A_PCK) 443 are continuously formed.

Figure 7:
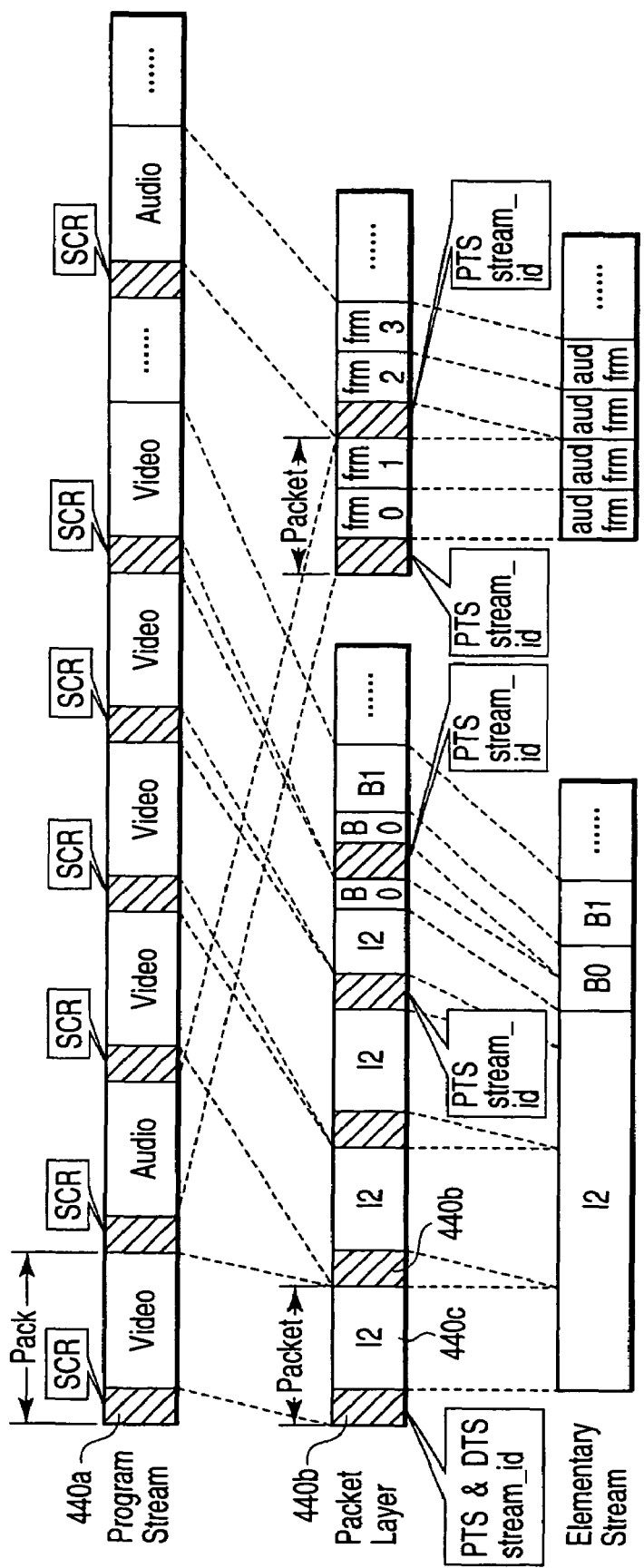
FIG. 7 shows a configuration of a program stream.

FIG. 7 shows a configuration of a program stream 440. Time information SCR (System Clock Reference) in which the pack reaches an input buffer (video buffer 121, sub-picture suffer 126, audio buffer 129, and PCI buffer 132 in FIG. 1) of each elementary decoder is described in a pack header 440a. Each pack can have at least one packet. A payload (a part except a packet header) 440c of the packet can have only single piece (one type) of elementary data. For example, the video data and the audio data can not be mixed together as one payload of the packet.

In a packet header 440b of each packet, stream_id is described. For the packet having private_stream_1 (=BDh) and private_stream_2 (=BFh) as stream_id, sub_stream_id is described in the first byte of the payload of the packet.

When a leading edge of the picture data is included in the video packet 442, the time DTS (Decoding Time Stamp) or the time PTS (Presentation Time Stamp) for the picture which includes the leading edge can be described in the packet header 440b of the video packet 442. The time DTS shows when the picture is decoded and the time PTS shows when the picture is displayed.

When the picture is an I picture or a P picture, DTS and PTS can be described in the packet header 440b. When the picture is a B picture, only PTS can be described in the packet header 440b.

When the leading edge of an audio frame is included in the audio packet 443, the time PTS for the audio frame which includes the leading edge can be described in the packet header 440b of the audio packet 443. The time PTS of the audio packet shows when the audio frame is decoded and presented.

When the leading edge of a sub-picture unit (SPU) is included in the sub-picture packet 444, the time PTS for the sub-picture unit which includes the leading edge can be described in the packet header 440b of the sub-picture packet 444. The time PTS of the sub-picture packet shows when a sub-picture display control sequence (SP_DCSQ) of the lead of the sub-picture unit is performed.

In the packet header 440b of the PCI packet, there is no field in which the time information is written.

When the stream separation unit 107 detects the packet having the same value as stream_id and sub_stream_id which are set in the register 107a by the system control unit 200, the stream separation unit 107 separates the payload of the packet to input the payload to the input buffers (the video buffer 121, the sub-picture buffer 126, the audio buffer 129, and the PCI buffer 132 in FIG. 1) of the corresponding elementary decoders. Accordingly, the video elementary stream is stored in the video buffer 121, the sub-picture elementary stream is stored in the sub-picture buffer 126, the audio elementary stream is stored in the audio buffer 129, and the PCI elementary stream is stored in the PCI buffer 132.

The stream separation unit 107 resets all system time clocks (STC) in the system with the value of SCR of the pack during the startup and transmits the PTS and DTS, which are separated from the packet of each elementary stream, to each elementary decoder (the video decoder 123, the sub-picture decoder 127, and the audio decoder 130 in FIG. 1). Each elementary decoder compares the time (STC) owned by each elementary decoder itself to PTS and DTS, which are received from the stream separation unit 107, to perform the decoding and the display.

Then, the operation of the first embodiment will be described.

Figure 8A:
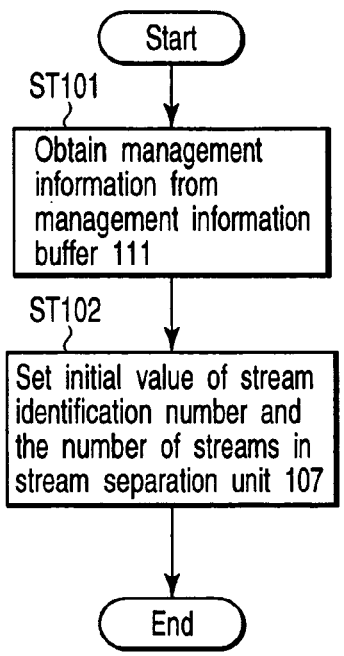
FIG. 8A to 8C are flowcharts showing operations of a system control unit according to a first embodiment.
Figure 8B:
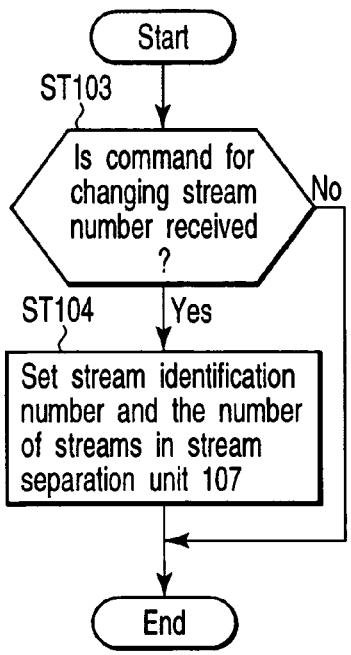

FIG. 8 is a flowchart showing the operation of the system control unit 200, and FIG. 9 is a flowchart showing the operation of the stream separation unit 107.

The system control unit 200 obtains the management information from the management information buffer 111 (ST101). The system control unit 200 sets the initial value and the number of streams (the total number of types of the stream identification numbers) of the stream identification numbers into the stream separation unit 107 with respect to each of the streams such as the video stream and the audio stream (ST102). When the system control unit 200 receives a command for changing the stream identification number from the user through the operation unit 201 (ST103), the system control unit 200 sets (changes) the value set in the register 107a of the stream separation unit 107 to the stream identification number and the number of streams which are specified by the command (ST104).

That is, the system control unit 200 sets the number of streams=1 and stream_id=E0h to the register 107a of the stream separation unit 107 with respect to the video data, and the system control unit 200 sets the number of streams=1, stream_id=BFh, and sub_stream_id=00h to the register 107a of the stream separation unit 107 with respect to the PCI data.

With reference to the audio data, in the management information (VTSI322), it is assumed that VTS_AST_Ns is two (two audio streams are multiplexed) and audio coding mode=000b (Dolby AC-3) and decoding audio stream number=0 are described in the audio stream No. 0 in one of VTS_AST_Ns. In this case, when the audio stream number which is selected by the user through the operation unit 201 or the audio stream number automatically selected in the startup is the audio stream No. 0, stream_id=BDh and sub_stream_id=80h are set in the register 107a of the stream separation unit 107. On the other hand, assuming that VTS_AST_Ns is two and audio coding mode=100b (linear PCM) and decoding audio stream number=0 are described in the audio stream No. 1, when the audio stream number which is selected by the user through the operation unit 201 or the audio stream number automatically selected in the startup is the audio stream No. 1, stream_id=BDh and sub_stream_id=A0h are set in the register 107a of the stream separation unit 107.

With reference to the sub-picture data, in the management information (VTSI322), it is assumed that VTS_SPST_Ns 344 is one (one sub-picture stream exists), the sub-picture stream No. 0 exists, and decoding sub-picture stream number=0 is described. In this case, the sub picture stream number which is selected by the user through the operation unit 201 or the sub picture stream number automatically selected in the startup becomes the sub-picture stream No. 0, and stream_id=BDh and sub_stream_id=20h are set in the register 107a of the stream separation unit 107.

In the DVD stream of DVD 100 loaded in the apparatus, it is assumed that two streams are multiplexed as the audio stream, i.e. the Dolby AC-3 in which stream_id is BDh and sub_stream_id is 81h (sub_stream_id does not coincide with that of the management information VTSI) and the linear PCM in which stream_id is BDh and sub_stream_id is A0h are multiplexed. Further, it is assumed that one sub-picture stream in which stream_id is BDh and sub_stream_id is 21h (sub_stream_id does not coincide with that of the management information VTSI) exists.

Figure 10:
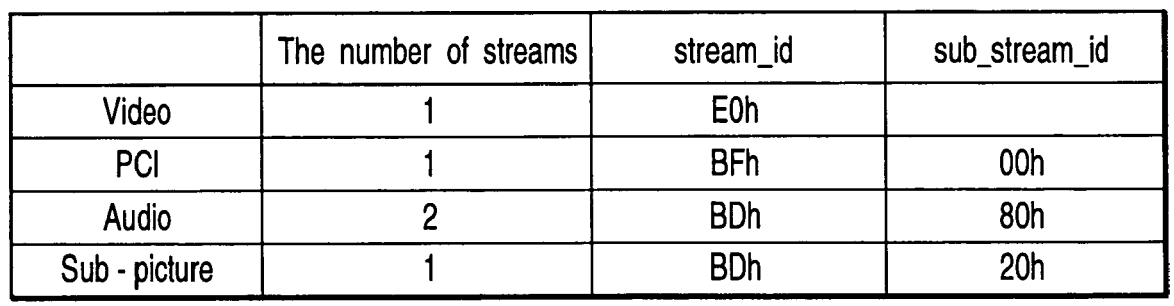

Further, it is assumed that the user selects the sub-picture stream, in which Dolby AC-3 is audio stream No. 0 and the sub-picture stream is sub-picture stream No. 0, through the operation unit 201. In this case, the system control unit 200 sets the number of audio streams=2, stream_id=BDh, and sub_stream_id=80h to the register 107a of the stream separation unit 107, or the system control unit 200 sets the number of sub-picture streams=1, stream_id=BDh, and sub_stream_id=20h to the register 107a of the stream separation unit 107. FIG. 10 shows the contents of the register 107a set in the above-described way.

Figure 9A:
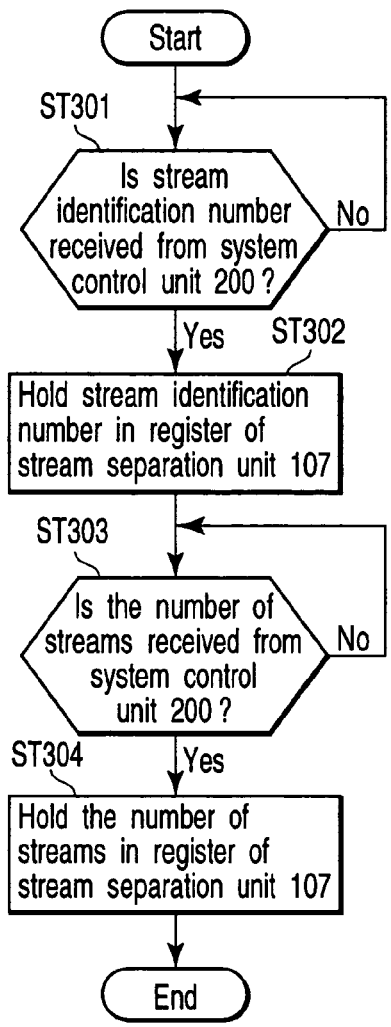
FIGS. 9A and 9B are flowcharts showing the operations of a stream separation unit according to the first embodiment.

At this point, the processing of the stream separation unit 107 is shown in the flowchart of FIG. 9A. The stream separation unit 107 holds the number of streams of each program stream (the total number of types of the stream identification numbers), stream_id, and sub_stream_id which are received from the system control unit 200 in the register 107a of the stream separation unit 107 as shown in FIG. 10 (ST301 to ST304).

Figure 9B:
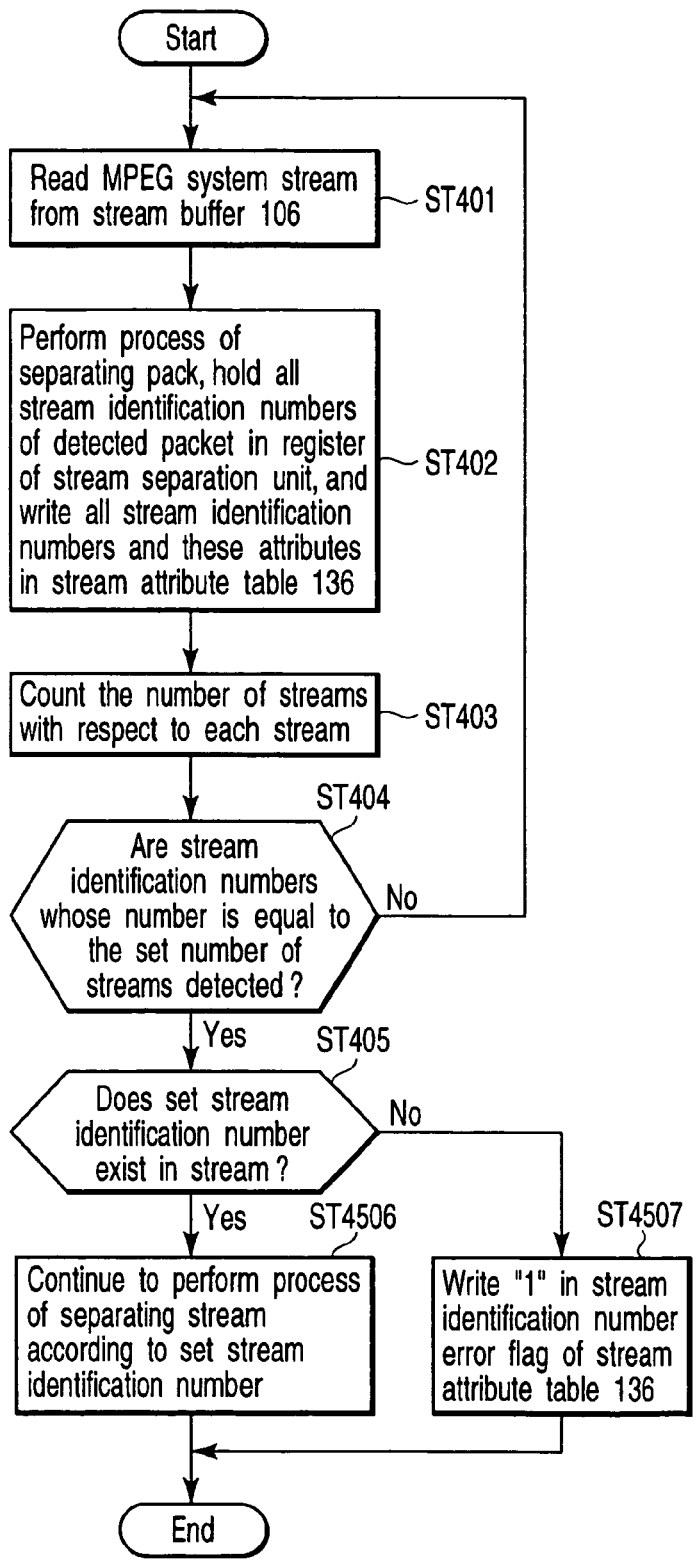

As shown in FIG. 9B, the stream separation unit 107 reads the MPEG system stream from the stream buffer 106 (ST401). The stream separation unit 107 performs a pack separation process, reads all the stream identification numbers described in the packet header of the detected packet, and writes the stream identification numbers in the register 107a of the stream separation unit 107. The stream separation unit 107 also writes the stream identification numbers and those attributes in the stream attribute table 136 (see FIG. 1) (ST402). FIG. 11 shows a configuration example of the data described in the stream attribute table 136.

The stream separation unit 107 counts the number of streams of the stream identification numbers different from one another with respect to each stream such as the video stream and the audio stream while writing the stream identification numbers and those attributes in the stream attribute table 136 (ST403). When the number of streams set by the system control unit 200 coincides with the detected streams of the stream identification numbers different from one another (YES in ST404), the stream separation unit 107 compares the contents of the register 107a to the contents of the register 107b to decide whether the set stream identification number exists in the stream (ST405). When the set stream identification number exists in the stream (YES in ST405), the stream separation unit 107 continues to perform the stream separation process according to the set stream identification number (ST406). When the set stream identification number does not exist in the stream (No in ST405), the stream separation unit 107 writes "1" in a stream identification number error flag of the stream attribute table 136 (ST407).

An example of the specific operation of the stream separation unit 107 according to the first embodiment of the invention will be described in more concrete below.

The stream separation unit 107 reads the packet from the stream buffer 106 (ST401). For example, in the case where the video packet is detected, the stream separation unit 107 writes stream_id of the video packet (for example, E0h) and the information written in the later-mentioned sequence_header (SH) shown in FIGS. 18 and 19 as the attribute of the video in the stream attribute table 136 (ST402). MPEG-2 is similar to the later-mentioned MPEG-1 in a position and contents of sequence_header. As with the MPEG-1 system stream, the MPEG-2 program stream has a hierarchical structure of a sequence layer, a GOP layer, a picture layer, and a macro-block layer in order from the upper hierarchy. In the sequence layer of the MPEG-2 program stream, sequence_extension always exists subsequent to sequence_header, which allows the decision to be made whether the MPEG-1 system stream or the MPEG-2 program stream. Therefore, the MPEG-2 program stream has the configuration in which sequence_extension is inserted subsequence to each sequence_header in FIG. 18. The contents of sequence_header of the MPEG-2 program stream are the same as the MPEG-1 system stream up to 140 bytes of the lead. However, a name depends on the flag. As shown in FIG. 19, in the MPEG-1 system stream, the sequence header has the contents named as horizontal_size, vertical_size, pel_aspect_ratio, picture_rate, and bit_rate. On the other hand, in the MPEG-2 program stream, the sequence header has the contents named as horizontal_size_value, vertical_size_value, aspect_ratio_information, frame_rate_code, and bit_rate_value.

When the stream separation unit 107 detects the audio packet, the stream separation unit 107 writes stream_id=BDh, sub_stream_id=81h, and attribute=Dolby AC-3 in the stream attribute table 136, or the stream separation unit 107 writes stream_id=BDh, sub_stream_id=A0h, and attribute=linear PCM in the stream attribute table 136. When the stream separation unit 107 detects the sub-picture packet, the stream separation unit 107 writes stream_id (for example, BDh) and sub_stream_id (for example, 21h) in the stream attribute table 136.

With reference to the audio, the stream separation unit 107 knows that the number of streams=2 (see FIG. 10) set by the system control unit 200 is received at the time when the stream separation unit 107 detects two audio streams, i.e. the Dolby AC-3 in which stream_id is BDh and sub_stream_id is A0h (sub_stream_id does not coincide with that of the management information) and the linear PCM in which stream_id is BDh and sub_stream_id is A0h from the DVD stream received through the stream buffer 106 (ST403 and ST404). However, when the stream_id=BDh and sub_stream_id=80h (see FIG. 10) do not exist in the received audio streams (NO in ST405), the stream separation unit 107 knows that the set audio identification number differs from the audio identification number actually existing in the stream, and the stream separation unit 107 writes audio_stream_id_error=1 in the stream attribute table 136.

With reference to the sub-picture, the stream separation unit 107 knows that the number of streams=1 (see FIG. 10) set by the system control unit 200 is received at the time when the stream separation unit 107 receives the sub-picture stream in which stream_id is BDh and sub_stream_id is 21h (sub_stream_id does not coincide with the management information VTSI). However, because the stream_id=BDh and sub_stream_id=20h (see FIG. 10) do not exist in the received sub-picture stream, the stream separation unit 107 knows that the set sub-picture identification number differs from the sub-picture identification number actually existing in the stream, and the stream separation unit 107 writes sub_picture_stream_id_error=1 in the stream attribute table 136.

Figure 8C:
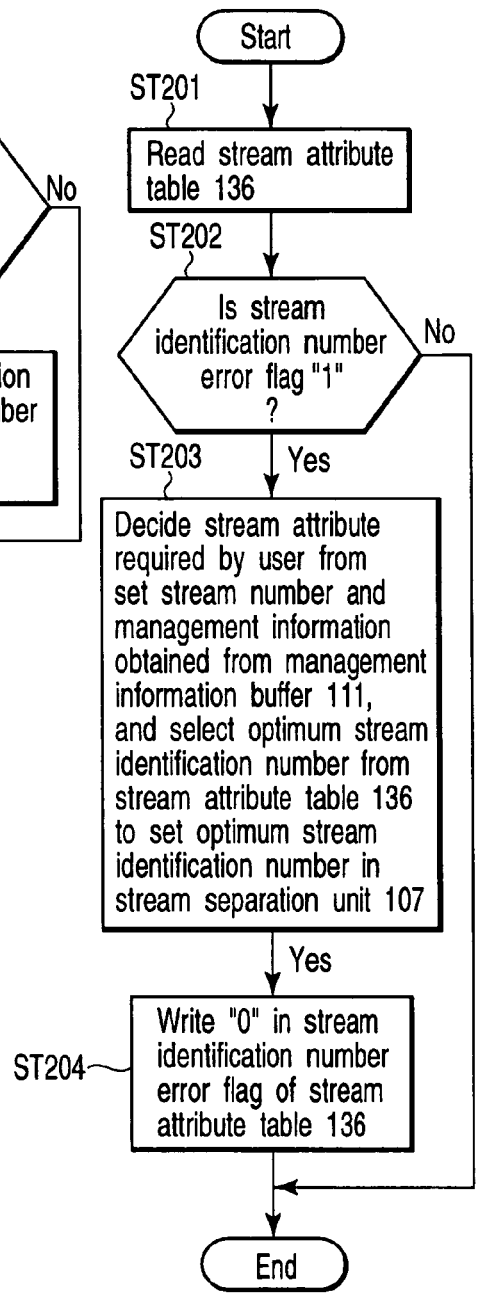

In ST201 of FIG. 8C, the system control unit 200 reads the stream attribute table 136. When the system control unit 200 detects audio_stream_id_error=1 of the stream attribute table 136 (YES in ST202), the system control unit 200 knows that the set audio identification number differs from the audio identification number actually existing in the stream. The system control unit 200 refers to the attribute of audio_information in the stream attribute table 136 to select the identification number which should actually be set, and the system control unit 200 sets stream_id=BDh and sub_stream_id=81h to the stream separation unit 107 (ST203). Then, the system control unit 200 writes audio_stream_id_error=0 in the stream attribute table 136 (ST204). Therefore, the correct audio is reproduced.

Further, when the system control unit 200 detects sub_picture_stream_id_error=1 of the stream attribute table 136 (YES in ST202), the system control unit 200 knows that the set sub-picture identification number differs from the sub-picture identification number actually existing in the stream. The system control unit 200 refers to the attribute of sub_picture_information in the stream attribute table 136 to select the identification number which should actually be set, and the system control unit 200 sets stream_id=BDh and sub_stream_id=21h to the stream separation unit 107. Then, the system control unit 200 writes sub_picture_stream_id_error=0 in the stream attribute table 136. Therefore, the correct sub_picture is reproduced.

As described above, according to the first embodiment, when the stream separation unit 107 detects the difference between the management information such as VMGI and VTSI and the actual stream information from the total number of elementary streams set by the system control unit, the stream separation unit 107 notifies the system control unit 200 of the difference. According to the notification, the system control unit 200 updates the contents of the register 107a in which stream_id of the elementary stream to be reproduced is described. Accordingly, even if the stream_id described in the management information of the medium differs from stream_id of the elementary stream included in the actual MPEG stream, the desired stream can normally be reproduced. That is, even if the error is generated in the management information, the stream can normally be reproduced.

Second Embodiment

Then, a second embodiment of the invention which is applied to the reproduction of a video CD will be described.

Figure 12:
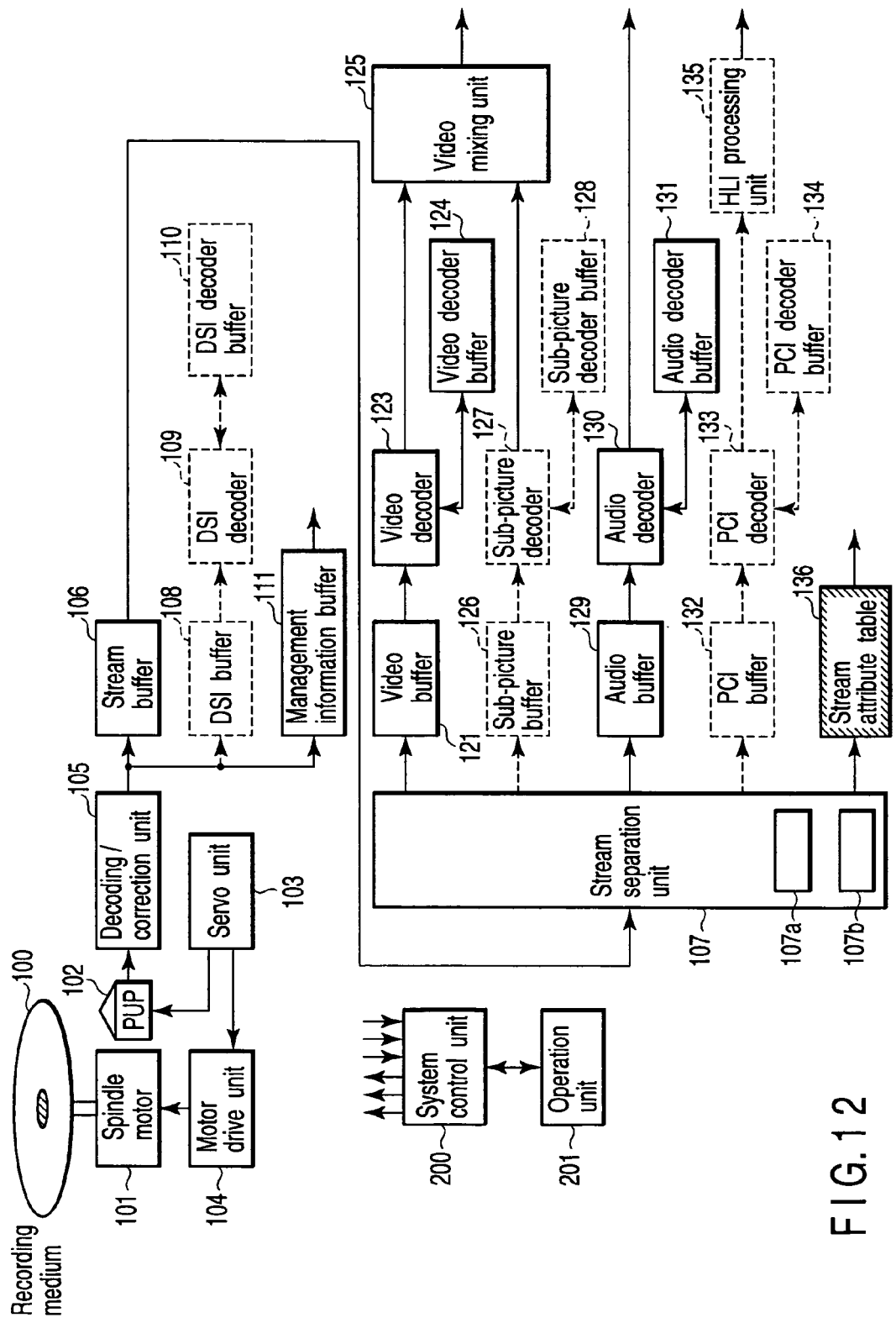
FIG. 12 is a block diagram in reproducing a video CD according to a second embodiment.

FIG. 12 shows a block diagram during the reproduction of the video CD of the invention. In the block diagram of FIG. 12, the blocks which are not used in the block diagram of FIG. 1 are shown by dotted lines.

Because the sub-picture data, the DSI data, and the PCI data do not exist in the stream (MPEG-1 stream) of the video CD, the sub-picture buffer 126, the sub-picture decoder 127, the sub-picture decoder buffer 128, the DSI buffer 108, the DSI decoder 109, the DSI decoder buffer 110, the PCI buffer 132, the PCI decoder 133, the PCI decoder buffer 134, and the HLI processing unit 135 are not used. Therefore, the operation of the video-CD reproduction becomes as described below.

In FIG. 12, the recording medium 100 loaded on the turntable (not shown) is rotated by the spindle motor 101. During the reproduction, the information recorded in the recording medium 100 is read by the pickup unit (PUP) 102. The servo unit 103 performs the feed control in the disk radial direction, the focus control, and the tracking control of the pickup unit 102. During the reproduction, the servo unit 103 also transmits the control signal to the motor drive unit 104 to perform the rotational control of the spindle motor 101, i.e. the rotational control of the recording medium 100.

The output of the pickup unit 102 is input to the demodulating/error correction unit 105 to perform the demodulation and error correction. The error corrected data is input to the stream separation unit 107 through the stream buffer 106. The error corrected data is transmitted to the system control unit 200 through the management information buffer 111. The management information including TOC (Table Of Contents) is written in the management information buffer 111, and the system control unit 200 reads the management information to perform the reproduction control. The stream separation unit 107 performs the process of separating each pack. The video pack (V_PCK) fetched by the stream separation unit 107 is input to the video decoder 123 through the video buffer 121 and decoded by the video decoder 123. The video decoder 123 is connected to the video decoder buffer 124. The video signal output from the video decoder 123 is input to the video mixing unit 125.

Therefore, the video signal is obtained from the video mixing unit 125, and the signal is supplied to the display. The audio pack (A_PCK) fetched by the stream separation unit 107 is input to the audio decoder 130 through the audio buffer 129 and decoded by the audio decoder 130. The audio decoder 130 is connected to the audio decoder buffer 131. The A/D conversion (not shown) of the output of the audio decoder 130 is performed and supplied to the speaker. The video information and the audio information are separated and derived in the stream separation unit 107. This is because the video information and the audio information are recorded in the recording medium 100.

User's input operation is given to the system control unit 200 through the operation unit 201. The decoding processing corresponding to the type of the display device is performed in the video decoder 123 which decodes the video information. For example, the video information is converted into NTSC, PAL, or the like. The audio information of the stream specified by the user is input to and decoded by the audio decoder 130.

Figure 13:
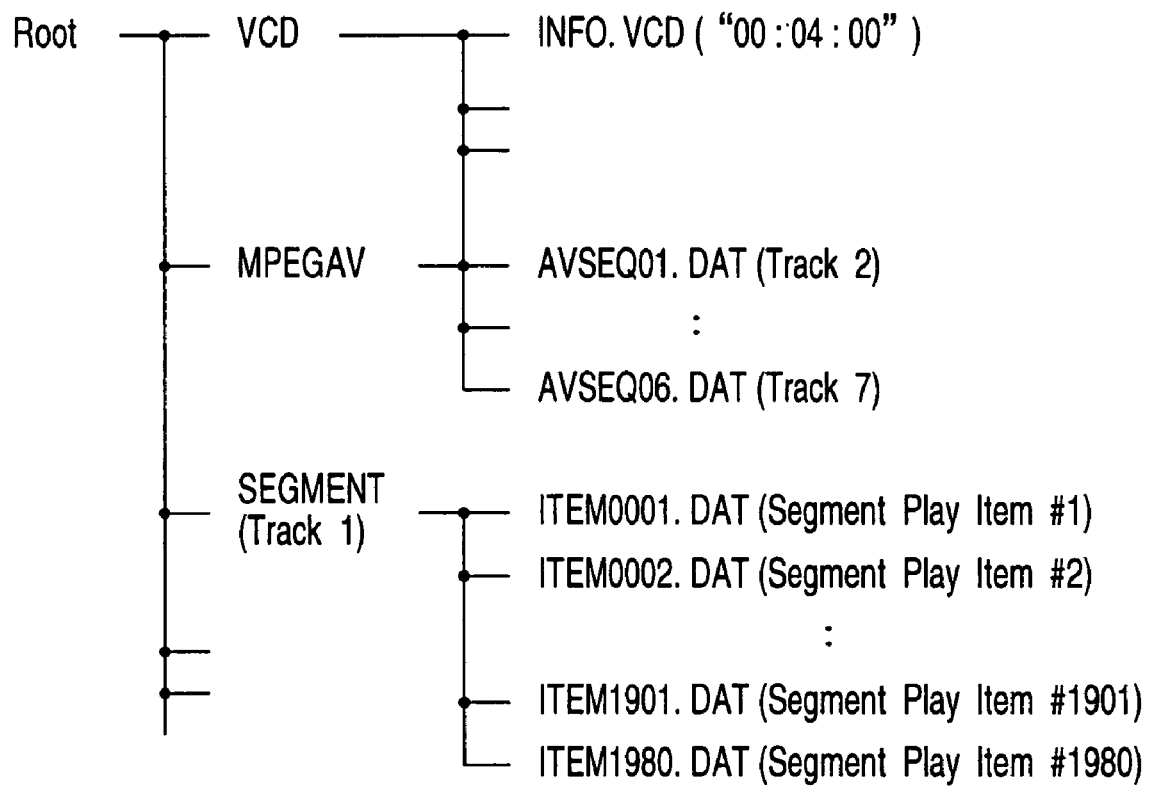
FIG. 13 shows a file structure of the video CD.

FIG. 13 shows a file structure of a video CD. The files such as an INFO.VCD file exist in a VCD directory, and the management information for reproducing the video CD is located in the VCD directory. The stream data of the video CD is located in an MPEGAV directory and a SEGMENT directory.

Figure 14:
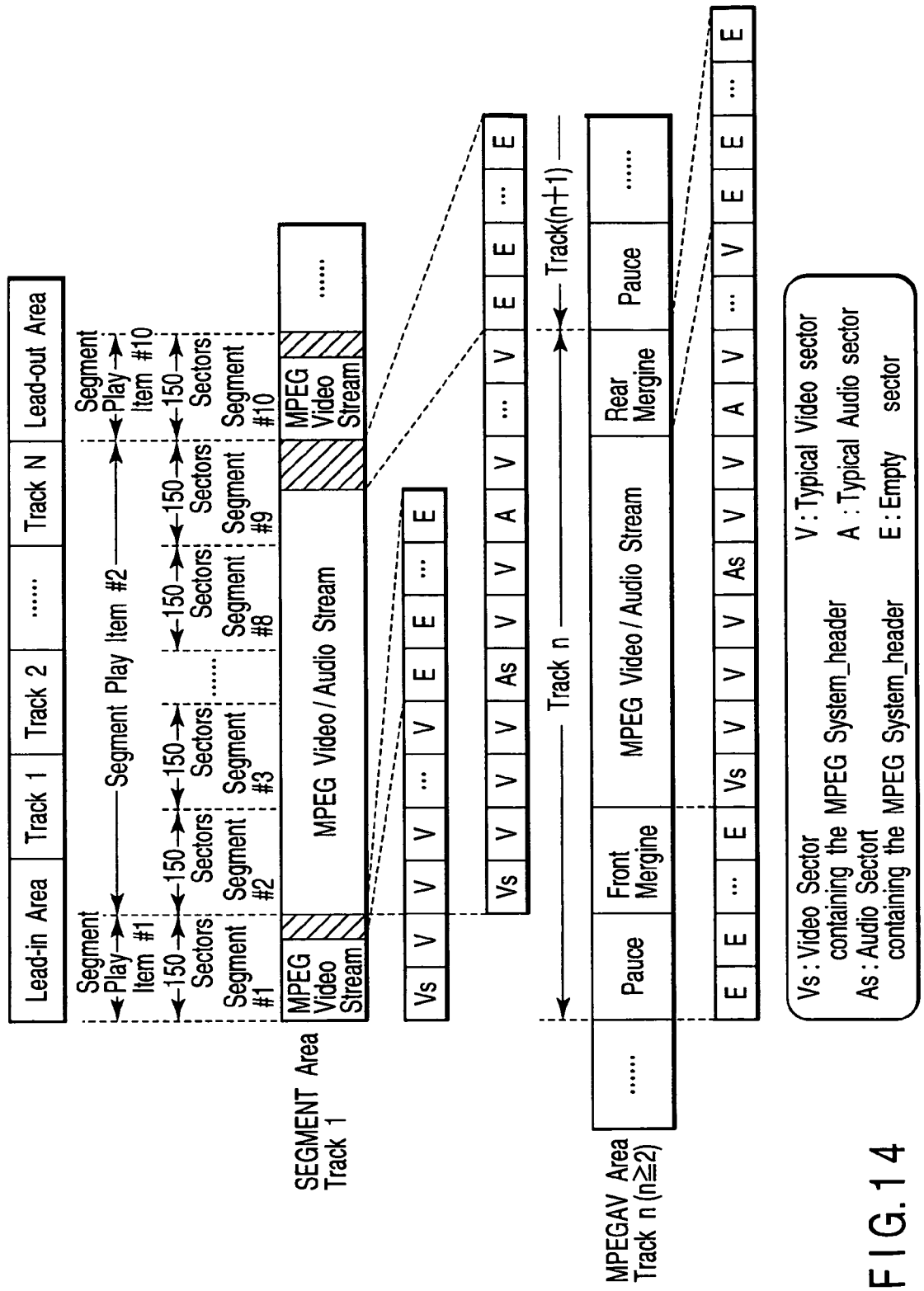
FIG. 14 shows a track structure of the video CD.

FIG. 14 shows a track structure of the video CD. The video CD disk starts at a lead-in area, a plurality of track areas follows the lead-in area, and the video CD disk ends at a lead-out area. The management information is described in the lead-in area.

A SEGMENT area corresponding to the SEGMENT directory exists in a track 1. A still picture corresponding to a menu screen, a slide show and a normal video/audio motion picture, and the like are recorded in one segment of 150 sectors. An MPEGAV area corresponding to the MPEGAV directory exists from a track 2, and the normal video/audio motion picture is recorded in the MPEGAV area. THESE VCD streams are pursuant to the MPEG-1 system stream.

Figure 15:
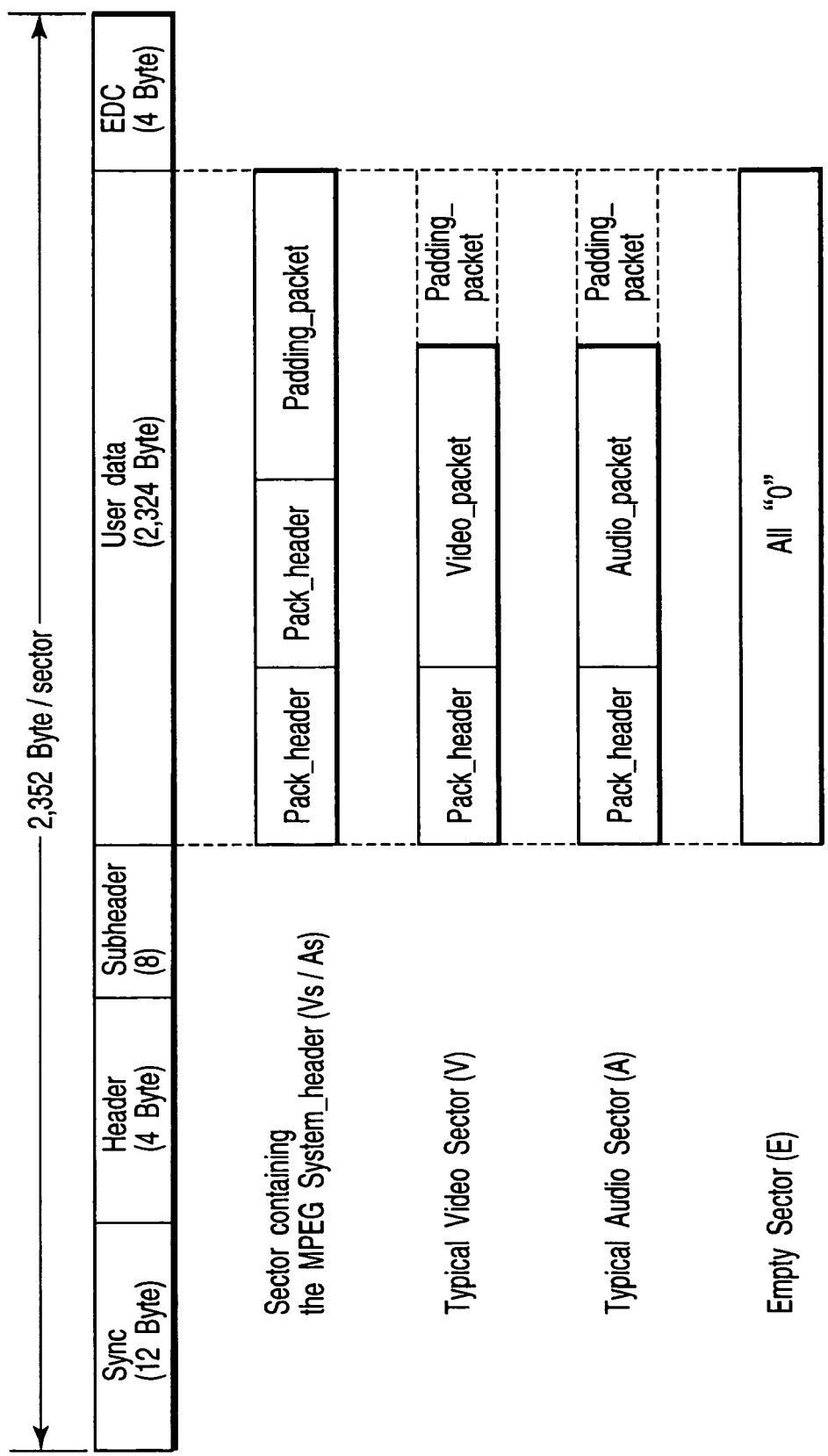
FIG. 15 shows a sector structure of the video CD.

FIG. 15 shows a sector structure of the video CD. As shown in FIG. 14, the sector having only a system header exists in the sectors of the video CD.

FIG. 16 shows the contents of the system header of the video CD. In the video CD, stream_id=E0h is given as the video identification number for the motion picture, stream_id=E1h is given for the normal resolution still which exists in the SEGMENT area (352 by 240 in the case of NTSC and 352 by 288 in the case of PAL), and stream_id=E2h is given for the high resolution still (352 by 480 in the case of NTSC and 352 by 576 in the case of PAL). However, the high resolution still exists in the form in which the high resolution still always interleaves the normal resolution still. Further, stream_id=C0h is given for the audio stream. FIG. 17 shows the stream identification number table of the video CD.

When the MPEGAV area from the track 2 is reproduced, the system control unit 200 sets stream_id=E0h in the register 107a of the stream separation unit 107 with respect to the video data, or the system control unit 200 sets stream_id=C0h in the register 107a of the stream separation unit 107 with respect to the audio data. When the SEGMENT area of the track 1 is reproduced, the system control unit 200 sets stream_id=C0h in the register 107a of the stream separation unit 107 with respect to the audio data. However, with respect to the video data, the system control unit 200 refers to a segment item contents table written in the INFO.VCD file of the VCD directory to decides whether the stream to be reproduced is (1) the motion picture, (2) the normal resolution still, or (3) the interleaving stream of the normal resolution still and the high resolution still. In the case of (1) the motion picture, the system control unit 200 sets stream_id=E0h. In the case of (2) the normal resolution still, the system control unit 200 sets stream_id=E1h. In the case of (3) the high resolution still, the system control unit 200 sets stream_id=E1h or stream_id=E2h.

Then, the operation of the stream separation unit 107 will be described.

Figure 18:
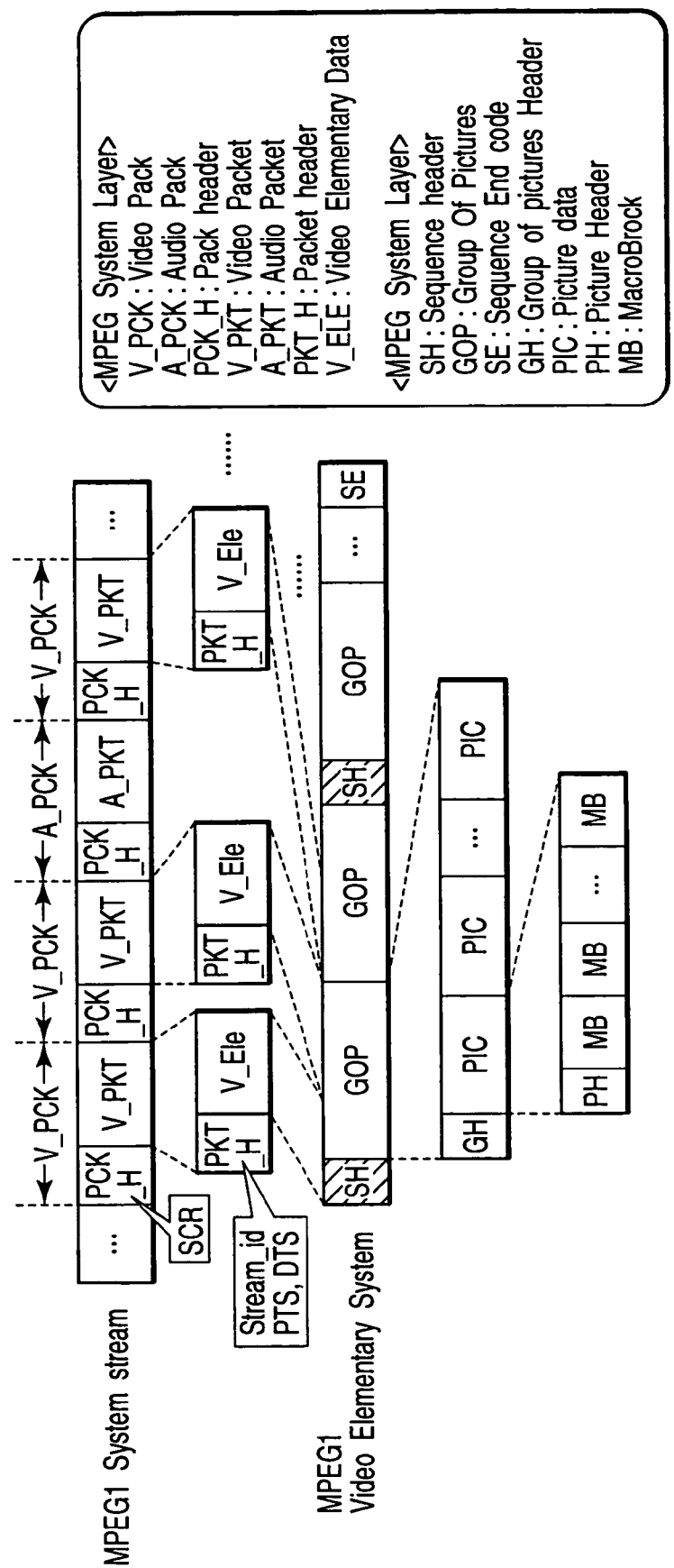
FIG. 18 shows a stream structure of the video CD.

FIG. 18 shows the stream structure of the video CD.

The video CD stream is pursuant to the MPEG-1 system stream. The video CD stream is formed by the continuous video pack (V_PCK) and audio pack (A_PCK). The time information SCR (System Clock Reference) in which the pack reaches the input buffer (the video buffer 121 and the audio buffer 129 in FIG. 12) of each elementary decoder is described in the pack header (PCK_H). Each pack can have at least one packet. The payload (a part except the packet header) of the packet can have only the single type of elementary data. For example, the video data and the audio data can not be mixed together as one payload of the packet.

In the packet header (PKT_H) of each packet, stream_id is described.

When the leading edge of the picture data is included in the video packet, the time DTS (Decoding Time Stamp) or the time PTS (Presentation Time Stamp) for the picture which includes the leading edge can be described in the packet header of the video packet. The time DTS shows when the picture is decoded and the time PTS shows when the picture is displayed. When the picture is the I picture or the P picture, DTS and PTS can be described in the packet header. When the picture is the B picture, only PTS can be described in the packet header.

When the leading end of an audio frame is included in the audio packet, the time PTS for the audio frame which includes the leading edge can be described in the packet header of the audio packet. The time PTS of the audio packet shows when the audio frame is decoded and presented With reference to the video elementary stream, the sequence header (SH) always exists at the lead of the sequence (from SH at the left end to SE at the right end of the elementary stream in FIG. 18), and the sequence header can arbitrarily be inserted at the front of a GOP header in the places except the lead. The contents of the sequence header are similar in one sequence. FIG. 19 shows the contents of the sequence header of the MPEG video elementary stream.

When the stream separation unit 107 detects the packet having the same value as stream_id set by the system control unit 200, the stream separation unit 107 separates the payload of the packet to input the payload to the input buffers (the video buffer 121 and the audio buffer 129 in FIG. 12) of the corresponding elementary decoders.

The stream separation unit 107 resets all system time clocks STC in the system with SCR of the pack during the startup and transmits PTS and DTS, which are separated from the packet of each elementary stream, to each elementary decoder (the video decoder 123 and the audio decoder 130 in FIG. 12). Each elementary decoder compares the time (STC) owned by itself to PTS and DTS, which are received from the stream separation unit 107, to perform the decoding and the display.

Then, the operation of the second embodiment will be described.

Figure 20A:
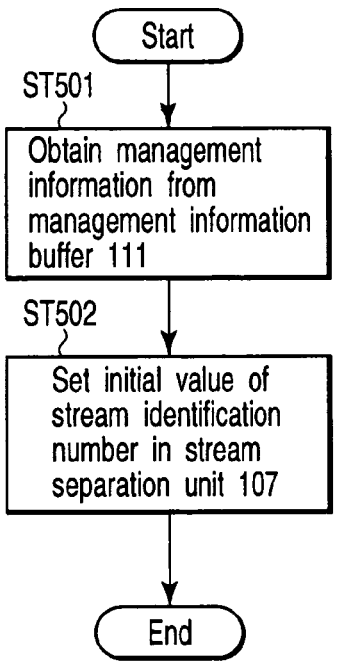
FIG. 20A to 20C are flowcharts showing the operations of the system control unit according to the second embodiment.
Figure 20B:
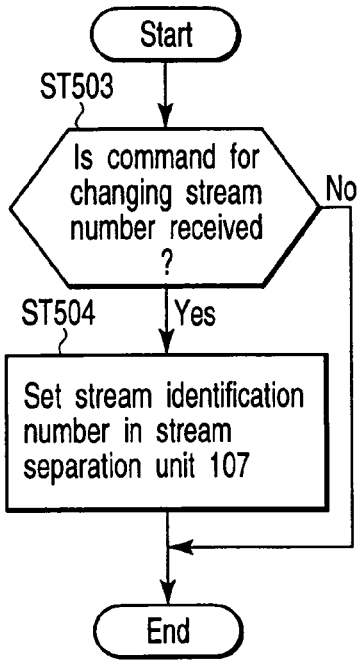
Figure 20C:
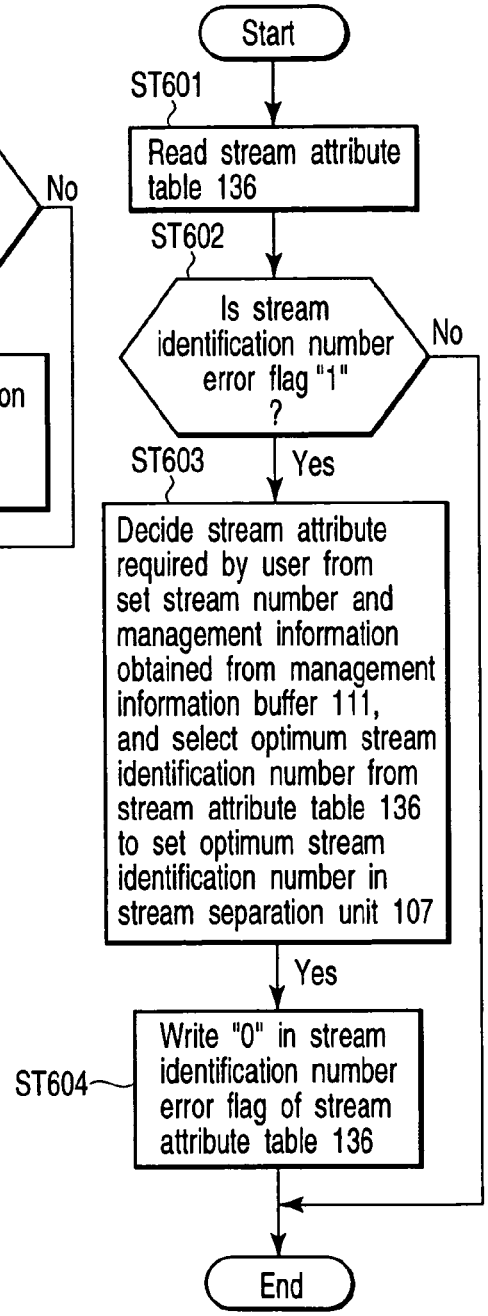
Figure 21A:
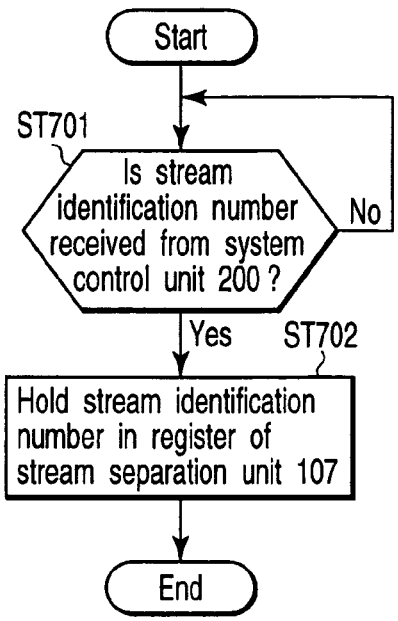
FIGS. 21A and 21B are flowcharts showing the operations of the stream separation unit according to the second embodiment.
Figure 21B:
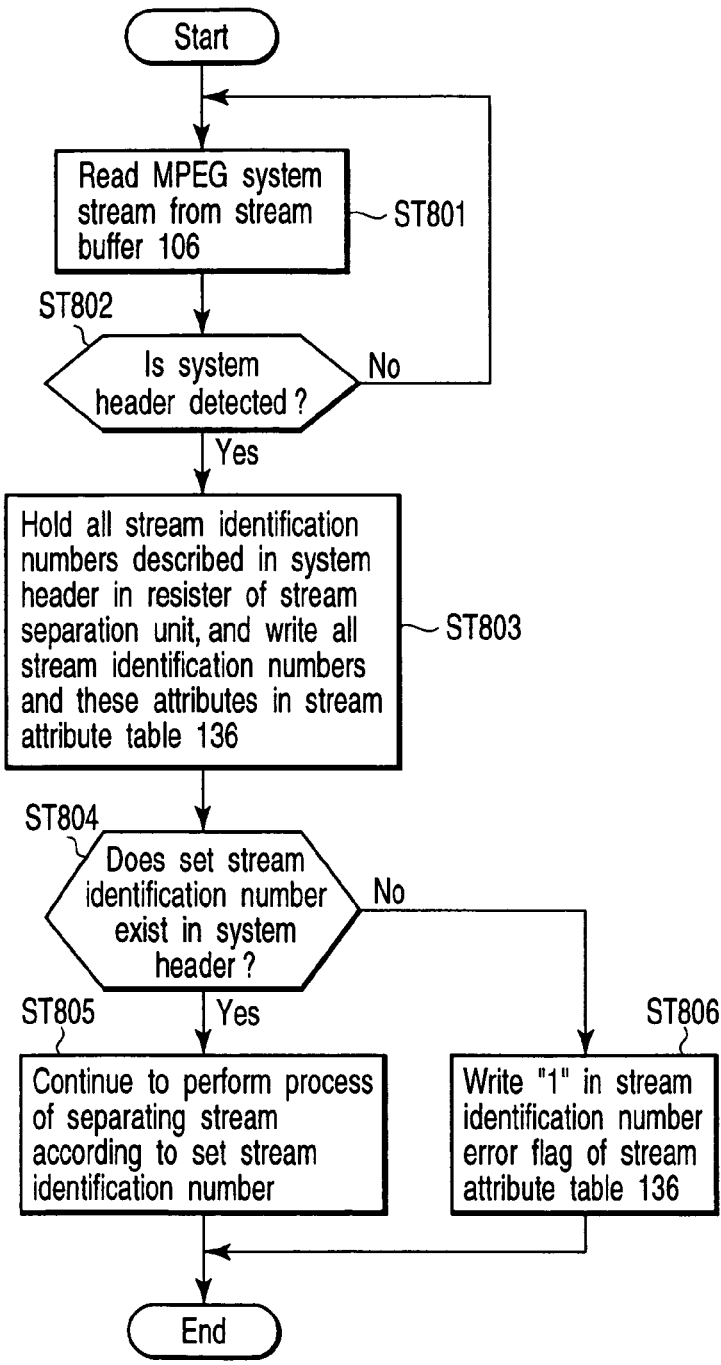

FIG. 20 is a flowchart showing the operation of the system control unit 200, and FIG. 21 is a flowchart showing the operation of the stream separation unit 107.

As shown in FIGS. 20A and 20B, the system control unit 200 obtains the management information from the management information buffer 111 (ST501). The system control unit 200 sets the initial value of the stream identification number (stream_id) in the register 107a of the stream separation unit 107 (ST502). The management information is one which is described in the lead-in area of FIG. 14. The system control unit 200 decides whether the command for changing the stream identification number is received from the user through the operation unit 201 (ST503). When the command for changing the stream identification number is received (YES in ST503), the system control unit 200 sets the stream identification number in the register 107a (ST104).

At this point, as shown in FIG. 21A, when the stream separation unit 107 receives the stream identification number from the system control unit 200 (YES in ST701), the stream separation unit 107 holds the stream identification number in the register 107a of the stream separation unit 107 (ST702).

It is assumed that the high resolution still of the SEGMENT area is selected by the user's operation (see FIG. 16). As a result, the system control unit 200 sets stream_id=E2h in the register 107a with respect to the video data.

However, it is assumed that stream_id=E1h for the normal resolution still (STD_buffer_size_bound=46) and stream_id=E3h (does not coincide with stream_id set in the register 107a) for the high resolution still (STD_buffer_size_bound≠46) are described in the video system header of the actually selected video CD stream.

The stream separation unit 107 holds all the stream identification numbers described in the system header of the MPEG system stream in the register 107b of the stream separation unit 107. The stream separation unit 107 detects the video packets of stream_id=E1h and stream_id=E3h to write these stream_ids and the information (horizontal_size, vertical_size, pel_aspect_ratio, picture_rate, and the like) written in the sequence header with respect to each video data as the video attribute in the stream attribute table 136 (ST801 to ST803). When the stream separation unit 107 detects the audio packet, the stream separation unit 107 writes stream_id=C0h and attribute=MPEG-1 audio in the stream attribute table 136 (ST801 to ST803).

The stream separation unit 107 compares the contents of the register 107a to the contents of the register 107b, recognizes that stream_id=E2h of the video set by the system control unit 200 does not exist in the video CD stream received through stream buffer 106, and writes video_stream_id_error=1 in the stream attribute table 136 (ST804 to ST806).

When the system control unit 200 detects video_stream_id_error=1 in the stream attribute table 136 (ST601 and ST602), the system control unit 200 knows the difference between the set video identification number and the video identification number which exists actually in the stream, refers to the attribute of video_information of the stream attribute table 136, selects the identification number to be actually set, and resets the contents of the register 107a of the stream separation unit 107 from stream_id=E2h to stream_id=E3h (ST603). Then, the system control unit 200 writes video_stream_id_error=0 in the stream attribute table 136 (ST604). Therefore, the correct video is reproduced.

As described above, according to the embodiment, when the stream separation unit 107 detects the difference between the management information and the actual stream information from the system header which exists in the MPEG stream, the stream separation unit 107 notifies the system control unit 200 of the difference. According to the notification, the system control unit 200 updates the contents of the register 107a in which stream_id of the elementary stream to be reproduced is described. Accordingly, even if the stream_id described in the management information of the medium differs from stream_id of the elementary stream included in the actual MPEG stream, the desired stream can normally be reproduced.

The above descriptions are only the preferred embodiments of the invention, and the apparatus and method of the invention are not limited to the descriptions. Further, the invention also includes the apparatus and method formed by appropriately combining constituents, functions, features, and steps in each embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video and audio reproduction apparatus which reproduces an MPEG stream including each of video and audio elementary streams recorded in a medium, the apparatus comprising:

a read unit which reads management information and the MPEG stream from the medium;

a setting unit which refers to the management information read by the read unit to set a stream identification number of each elementary stream to be reproduced and the total number of types of the stream identification numbers in each of the elementary streams;

a detection unit which detects the stream identification number and an attribute of the stream from the MPEG stream read by the read unit and records a combination of the stream identification number and the attribute of the stream as a stream attribute table in a memory;

a notification unit which make a notification that the stream having the stream identification number does not exist, when the stream identification number set by the setting unit can not be detected from the MPEG stream read by the read unit; and a resetting unit which receives the notification of the notification unit to reset the stream identification number of the elementary stream to be reproduced based on the stream attribute table.

2. A video and audio reproduction apparatus according to claim 1, further comprising a counter unit which counts the number of types of the stream identification numbers detected by the detection unit with respect to each elementary stream, wherein the notification unit notifies the setting unit that the stream having the stream identification number does not exist, when the stream identification number set by the setting unit can not be detected by the detection unit even if the number of types of the stream identification numbers counted with respect to each elementary stream reaches the total number of types of the stream identification numbers set for each elementary stream by the setting unit.

3. A video and audio reproduction apparatus according to claim 1, wherein the resetting unit changes the set of the stream identification number corresponding to the elementary stream to be reproduced based on the attribute described in the stream attribute table when the notification unit notifies the resetting unit of stream identification number error of any stream.

4. A video and audio reproduction apparatus which reproduces an MPEG stream including each of video and audio elementary streams recorded in a medium, the apparatus comprising:

a read unit which reads management information and the MPEG stream from the medium;

a setting unit which refers to the management information read by the read unit to set a stream identification number of each elementary stream to be reproduced;

a first detection unit which detects the stream identification number from a system header of the MPEG stream read by the read unit;

a second detection unit which detects the stream identification number and an attribute of the stream from a pack header of the MPEG stream read by the read unit and records a combination of the stream identification number and the attribute of the stream as a stream attribute table in a memory;

a notification unit which make a notification that the stream having the stream identification number set by the setting unit does not exist, when the stream identification number set by the setting unit can not be detected in stream identification numbers detected from the system header; and a resetting unit which receives the notification of the notification unit to reset the stream identification number of the elementary stream to be reproduced based on the stream attribute table.

5. A video and audio reproduction apparatus according to claim 4, wherein the resetting unit changes the set of the stream identification number corresponding to the elementary stream to be reproduced based on the attribute described in the stream attribute table when the notification unit notifies the resetting unit of stream identification number error of any stream.

6. A video and audio reproduction method which reproduces an MPEG stream including each of video and audio elementary streams recorded in a medium, the method comprising:

reading management information and the MPEG stream from the medium;

referring to the read management information to set a stream identification number of each elementary stream to be reproduced and the total number of types of the stream identification numbers in each of the elementary streams;

detecting the stream identification number and an attribute of the stream from the read MPEG stream and recording a combination of the stream identification number and the attribute of the stream as a stream attribute table in a memory;

making a notification that the stream having the stream identification number does not exist, when the set stream identification number can not be detected from the MPEG stream read; and receiving the notification that the stream having the stream identification number does not exist, to reset the stream identification number of the elementary stream to be reproduced based on the stream attribute table.

7. A video and audio reproduction method according to claim 6, further comprising counting the detected number of types of the stream identification numbers with respect to each elementary stream, the making the notification including notifying that the stream having the stream identification number does not exist, when the set stream identification number can not be detected even if the number of types of the stream identification numbers counted with respect to each elementary stream reaches the total number of types of the stream identification numbers set for each elementary stream.

* * * * *